United States Patent [19]  
Watten

[11] 4,253,181  
[45] Feb. 24, 1981

[54] SYNCHRONIZATION ARRANGEMENTS FOR DIGITAL SWITCHING CENTERS

[75] Inventor: Laurence E. Watten, Maidenhead, England

[73] Assignee: Plessey Handel und Investments AG, Switzerland

[21] Appl. No.: 6,881

[22] Filed: Jan. 25, 1979

Related U.S. Application Data

[63] Continuation-in-part of Ser. No. 804,078, Jun. 6, 1977, abandoned.

[30] Foreign Application Priority Data

Jun. 19, 1976 [GB] United Kingdom ............... 25567/76

[51] Int. Cl.³ .......................... H04J 3/06; H04L 5/14
[52] U.S. Cl. ..................................... 370/103; 375/107
[58] Field of Search ............... 325/58, 63; 179/15 BS; 343/179; 178/69.1; 455/51, 68, 69, 71; 375/107, 109, 111; 370/24, 29, 100, 103, 108

[56] References Cited

U.S. PATENT DOCUMENTS

| 3,050,586 | 8/1962 | Runyon | 179/15 BS |
| 3,479,462 | 11/1969 | Yamato et al. | 179/15 BS |
| 3,504,125 | 3/1970 | Inose et al. | 179/15 BS |
| 3,980,835 | 9/1976 | Mitchell et al. | 179/15 BS |
| 4,074,080 | 2/1978 | Dragotinov et al. | 179/15 BS |
| 4,142,069 | 2/1979 | Stover | 370/103 |

Primary Examiner—Marc E. Bookbinder  
Attorney, Agent, or Firm—Fleit & Jacobson

[57] ABSTRACT

For use in a multi-node digital network wherein the local clocks of all the nodes are required to be maintained in synchronism, and corrections are required to be effected for changes in propagation times of internode links. A clock deviation at either of two link-connected nodes is oppositely detected at both nodes, and this results in each node transmitting, in place of a normal "do-nothing" signal, an "advance" or a "retard" signal (i.e. opposite types) to the other to correct for the deviation. Each signal transmitted is allowed to be operative on the clock at the receiving node only if no other link, terminated on that node, is producing a contrary signal. Thus the clock of the node which has drifted is subjected to correction by a signal from the partner node. As regards a change in propagation-delay of the link (same for each direction of transmission) this results in both nodes of the effected link transmitting identical "advance" or "retard" signals to the partner. These signals are assessed at each node as a demand in each case to similarly adjust the timing off-set appertaining to the frame alignment signal.

6 Claims, 8 Drawing Figures

SYNCHRONIZATION ARRANGEMENTS FOR DIGITAL SWITCHING CENTERS

This application is a continuation-in-part of application Ser. No. 804,078, filed June 6, 1977, and now abandoned.

The present invention relates to synchronisation arrangements for digital switching-centres or nodes of a switching network which are interconnected to digital transmission links.

The invention is more particularly concerned with digital switching networks of the kind in which each switching-centre is provided with a substantially frequency-stable oscillator, from which locally-used clock sources (controlling at least the outgoing-transmission bit-rate) are derived, and involving control means for use in appropriate circumstances in advancing or retarding the phase of the oscillator in relation to the phase of clock signals, derived from the digital transmission of each remote switching-centre terminated on the particular switching-centre.

The invention will find application in switching networks wherein the switching-centres are served by multi-channel inter-exchange links using pulse-code modulation (p.c.m.), and wherein at the switching centres themselves, connections between incoming and outgoing lines or channels, of requisite links, are set-up, on a time-division multiplex (t.d.m.) basis. A known type of 32-channel p.c.m. transmission system may well be used for each direction of transmission provided by each two-line link between a pair of switching centres of the network. In this system a line-bit transmission rate of 2048 Kb/s is employed and each regularly recurring t.d.m. frame encompasses thirty-two 8-bit time-slots numbered 0 to 31 and appearing in that order; each succession of sixteen frames constituting a so-called super-frame. The frame repetition-rate is 8 K per sec, and within each frame, time slots 1 to 15 and 17 to 30, using an 8-bit coding, are generally available for use as thirty speech-transmission channels for a particular direction of transmission. In each super-frame, the first appearance of slot 16 is allocated for multi-frame alignment purposes, whereas the succeeding fifteen appearances of that slot are allocated to the thirty speech channels for signalling purposes. In the latter respect four signalling bits are provided for each said channel; the first and second groups of four bits of each 8-bit time slot relating to a different speech channel.

The first time slot "0" of alternate frames of each super-frame are each partially used for frame alignment signalling (even frames) and so-called house-keeping purposes (odd frames) respectively. In the known 32-channel system the last seven bits of said even frame slots are specifically used for frame alignment purposes leaving the first bit position (currently reserved for international use) available for additional signalling at the rate of 4 Kb/s (i.e. the frame repetition rate). The particular slots (8-bits) are to be conveniently referred to as the FAS (frame alignment signal) slots and the signals contained therein are to perform important functions in relation to the present invention.

Also in relation to the present invention another 4 Kb/s signalling facility is to be invoked using typically bit 5 of slot O, of the odd-numbered frames; the signalling facility being used to carry oscillator-control information (in a coded form) between nodes.

According to one embodiment of the invention there is provided a communication network including a first centre and at least a second centre connected together by a two-directional link having a multi-channel t.d.m. transmission system using p.c.m. techniques for each direction of transmission and each said centre includes a substantially-stable oscillator for the control of a local clock providing pulse-sources relating the bit-rate of the outgoing transmission of the link and to other possible outgoing transmissions of the centre and link equipments for each link responsive to the incoming transmission and operative to synchronise the outgoing transmission of the particular link with the local clock said equipment includes:

(a) first detecting means for assessing the bit-rate of the incoming transmission in relation to acceptable threshold limits of a datum which is set according to the frequency of the oscillator of the centre and arranged to produce one of three output signals indicating that the bit-rate of the incoming transmission is, by comparison with said datum, lagging or leading within said limits, (b) second detecting means responsive to whichever of three mutually-exclusive control signal patterns is included in said incoming transmission and producing an output signal appropriate to a request for advancement or retardation or no-change of the frequency of the local oscillator, (c) means for injecting into the outgoing transmission one of three control-signal patterns signifying requests for advancement or retardation or no-change of the frequency of the oscillator at the other centre, (d) first logic means controllable by said first and second detecting means in such manner that it produces a signal (i) to increase the local oscillator frequency as a result of the first detecting means signifying that the incoming transmission is leading said datum and said second detecting means requesting advancement, (ii) to decrease the oscillator frequency as a result of first detecting means signifying that the incoming transmission is lagging said datum and said second detecting means is requesting retardation.

The above and other features of the invention will be understood from the following description of a preferred embodiment which should be read in conjunction with the accompanying drawings.

Figure 1:
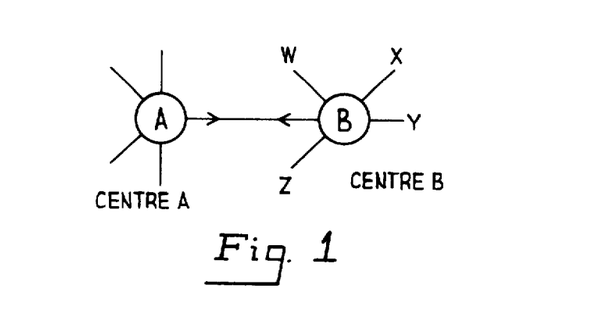
FIG. 1 shows two interconnected p.c.m. switching centres.

In the drawings, FIG. 1 represents two p.c.m. switching-centres or nodes A and B interconnected in each direction by individual 32-channel p.c.m. transmission systems; each switching-centre being likewise connected to other switching-centres of a larger digital-switching network. FIG. 2 again shows the interconnected switching-centres A and B with sufficient of centre B represented, in block schematic form, to enable the invention to be understood, and it should be understood that circuit arrangements identical with those shown for centre B are incorporated in switching centre A.

Referring to FIG. 1 it should be understood that switching centres A and B, like all other nodes of the network, each incorporate a crystal-controlled oscillator working at typically 4096 KHz to an accuracy better than 50 p.p.m. Typically the oscillator, at switching centre B, provides (by dividing techniques) all the local clock-sources of that centre including the frame alignment signal incorporated in outgoing digital transmissions. The oscillator has novel arrangements associated with it for correcting any detected frequency drift in relation to the corresponding oscillator at any of the remote switching centres A, W, X, Y and Z, since persistant un-corrected frequency drift could lead so-called "frame-slip" and consequence loss of information.

Figure 2:
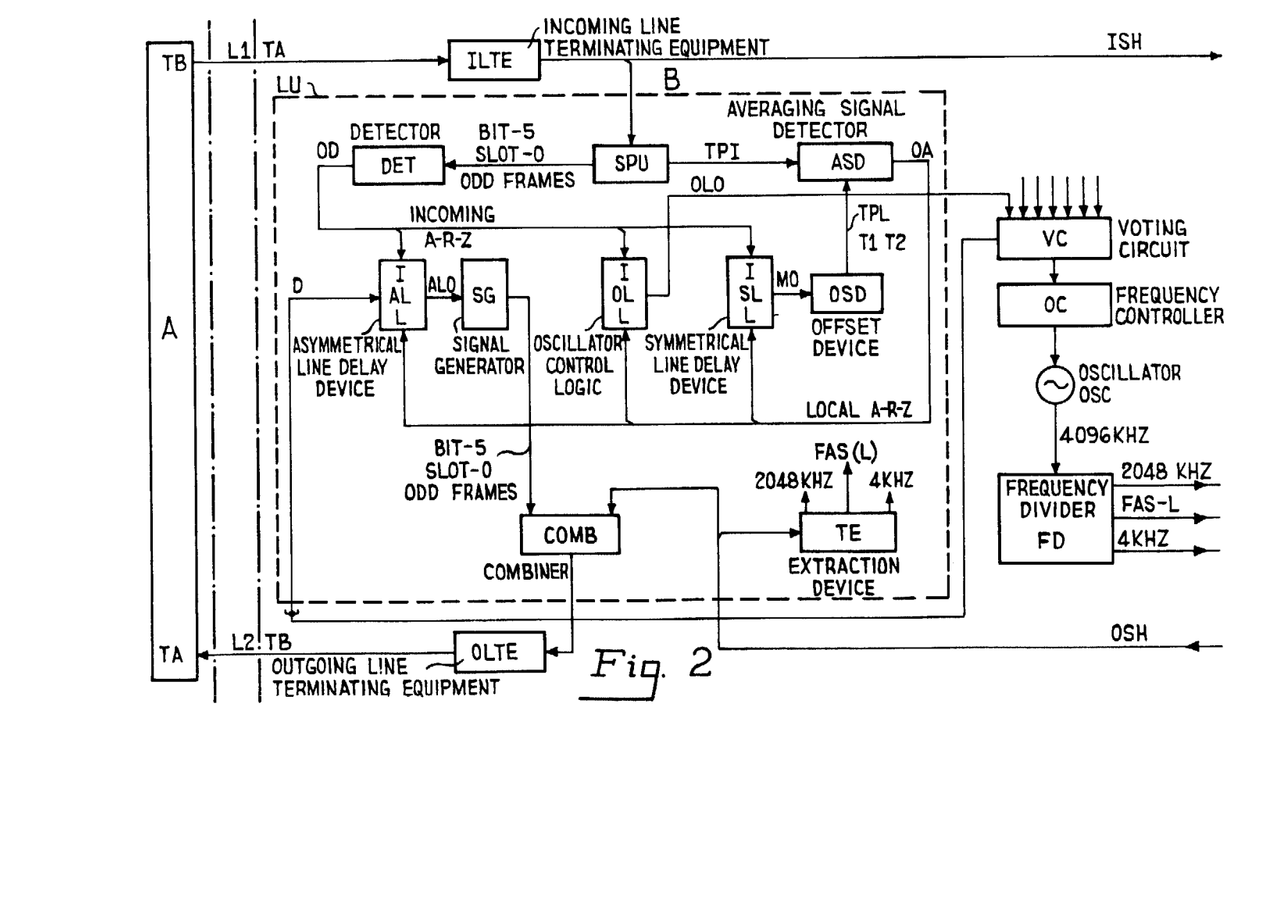
FIG. 2 shows a block diagram of a switching system and more particularly a block diagram of a link unit.

In the diagram FIG. 2, the switching-centres A and B are shown as being connected by a link comprising two 32-channel transmission lines L1 and L2 which are incoming and outgoing respectively with respect to centre B. Lines L1 and L2 connect terminations TA and TB of centre B to terminations TB and TA respectively of centre A. Termination TB of switching centre B, like the corresponding termination TB of switching centre A, is provided with an outgoing line terminating equipment OLTE which acquires signalling and speech data from a so-called combiner COMB which obtains p.c.m. signalling and speech signals from the channels of the outgoing highway OSH. The combiner, under control of appropriate clock sources derived ultimately from the common crystal-controlled oscillator OSC (4096 KHz) of centre B, and its associated frequency divider FD (giving a range of clock-sources), is concerned with the organisation of the outgoing transmission involving the 32-channel frame and super-frame format already alluded to. In particular the combiner, which is incorporated in the link unit LU of the connection involving the particular link, is concerned with receiving data (speech, timing and signalling) over highway OSH from the switching area of the centre and which already includes a frame alignment signal pattern. The combiner may be considered as adding to the highway data, which it receives, an instruction signal for controlling the frequency of the common oscillator at the remote centre A. Three signal forms are permitted namely "A", "R" and "Z" denoting "advance", "retard" and "do-nothing" respectively, and any one of these is produced as a result of an over-writing technique performed in respect of bit 5, slot O to odd frames in the transmission format.

Termination TA of switching-centre B (like termination TA of centre A) is provided with incoming line terminating equipment ILTE containing a line regenerator. Equipment ILTE extends to a so-called splitting unit SPU and also to the highway ISH going to the switching area. The splitting unit is operative at the actual line bit-rate (nominally 2048 Kb/s) of the transmission incoming over line L1 to extract the bit and frame timing signal, i.e. the incoming frame alignment signals FAS (I), and also the current synchronisation signalling pattern "A" "R" or "Z" (as the case may be) generated at centre A. Albeit all thirty-two incoming time slots are reproduced intact on the incoming highway ISH, and this like the previously-mentioned outgoing highway OSH is connected, together with the similar highways, to the switching area of the centre.

It is pointed out that, in the switching area, the local clock frequencies and the local frame alignment signals are effectively introduced into the outgoing highway OSH. Within the particular link unit an extraction device TE extracts all the relevant items for use within said link unit.

At each of the two switching-centres, the splitting unit SPU is operative in relation to the bit-rate of the transmission from the remote centre which is governed by the actual frequency of the common oscillator at that centre. All signals derived from the splitting unit are based on the bit-rate of the incoming transmission, and those constituted by the 7-bit pattern forming the previously-mentioned FAS (frame aligning signal) channel together with those constituting incoming "A", "R" or "Z" patterns (bit 5, slot O of odd frames) are to be used for signalling and control purposes in relation to clock-synchronisation functions.

The link unit LU, otherwise known as the synchronising utility, of the typical switching-centre includes an off-set device OSD and an averaging signal detector or comparator device ASD. The averaging signal detector is controlled (a) in accordance with the central oscillator at remote centre A by the incoming line-bit patterns (seven bits) of the repetitive beforementioned FAS (frame alignment) signals which together are extracted over lead TPI from the splitting unit as a single timing-pulse, and (b) in accordance with a corresponding signal forthcoming over TPL from the off-set device OSD. The last-mentioned signal has a specific time-relationship with frame alignment signals employed in outgoing transmissions from switching-centre B.

The pulse at lead TPI (appropriate to the incoming frame alignment signal), together with the pulse lead TPL (appropriate to the off-set, i.e. delayed, local frame alignment signal) are used by the averaging signal detector ASD to decide where the average position of the incoming FAS (frame alignment signal) lies relative to the off-set local FAS defined by off-set device OSD. Two thresholds are provided by device ASD and typically these are separated by one bit period of the line bit rate (2048 Kb/s). When the average position of the incoming FAS lies between these threshold points a "Z" or "do-nothing" condition is produced by device ASD at its output lead OA; indicating that no action is required. Either side of the threshold points the incoming FAS is said to be either lagging or leading the local FAS of the switching centre B, and these situations are signified by the "Z" signal at lead OA of device ASD being replaced by an "A" advance or "R" retard signal respectively. The "A" or "R" output signal of the averaging signal detector would be interpreted that an advance or retard condition is required to be transmitted to the remote centre A for appropriate control of the common oscillator thereat (to alleviate said lagging or leading situation respectively) unless an asymmetrical change has been detected in respect of the two lines of the link. The "A", "R" or "Z" condition forthcoming over lead OA is assessed in relation to that one of three similar conditions "A", "R" or "Z" forthcoming at the output OD of signalling detector DET according to the prevailing oscillator control signal included in the transmission from the remote switching centre. This signal (comprising a significant bit-pattern), as already stated uses bit 5 slot O of odd frames of the incoming transmission.

Figure 3:
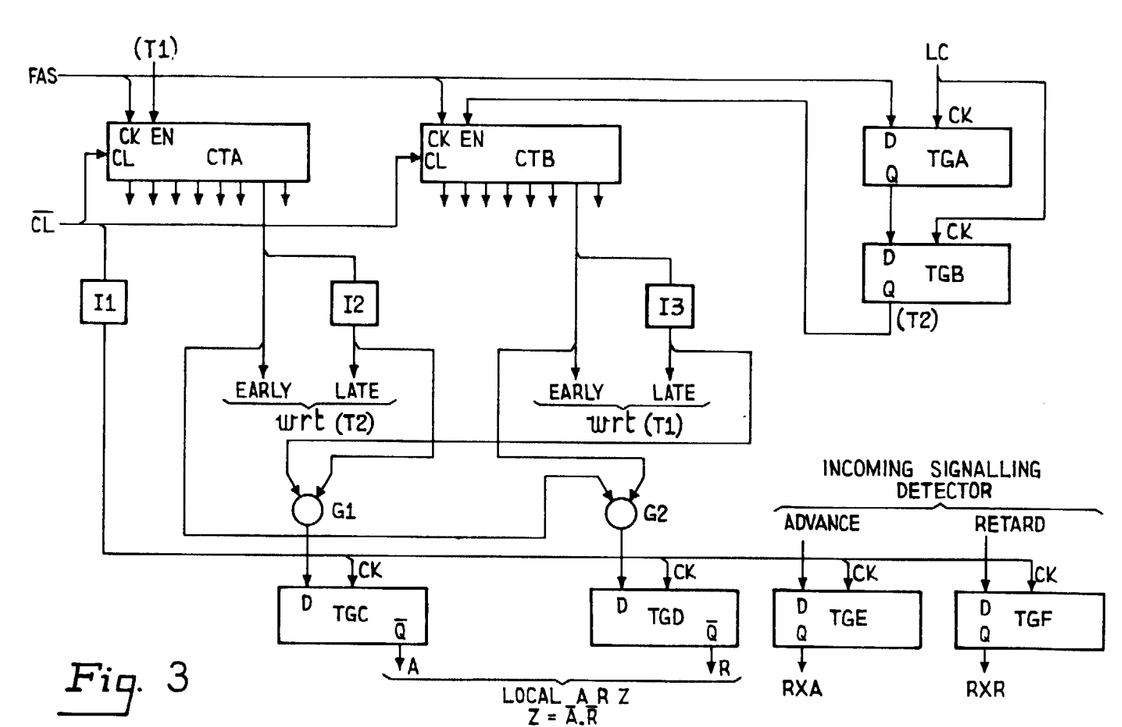
FIG. 3 shows a circuit diagram of an averaging signal detector device ASD.

Referring to FIG. 2 and FIG. 3 device ASD comprises two 8 bit counters CTA, CTB driven by signal FAS. Counter CTA is enabled by signal T1 (most significant digit thereof) from device OSD (FIG. 2). Counter CTB is enabled by the output (T2) of D-type toggle combination TGA, TGB. Both toggles are clocked by a local clock pulse LC (4096 KHz), and toggle TGA has signal FAS, applied to its D input. Counters CTA and CTB are cleared every 16 ms by signal $\overline{CL}$. Signal $\overline{CL}$ is inverted by inverter I1 providing a clock pulse for D-type toggles TGC to TGF.

The seventh bit output of counters CTA, CTB derive 'Early' and 'Late' signals with respect to signal T1 and signal T2 respectively, the 'Late' signals being derived by inverters I2 and I3 respectively. The 'Late' signals are fed to NAND-gate G1, the output of which is applied to the D-input of toggle TGC, and the 'Early' signals are fed to NAND-gate GS, the output of which is applied to the D-input of toggle TGD. The output of toggle TGC provides the local advance signal A and the output of toggle TGD provides the local retard signal R. The Z signal is derived by $\overline{A}\cdot\overline{R}$.

Toggles TGE and TGF receive respective advance and retard signals at the D-inputs from the incoming signalling detector and the respective Q outputs provide incoming advance and retard signals RxA and RxR respectively.

The off-set device OSD is a device which is controlled from a local clock-source and provides predetermined limits defining an aperture or time-slot which embraces the time-displacement constituted by the propagation time of the incoming transmission line. Device OSD is initially set to suit the then prevailing line-propagation time either manually or automatically, but subsequently the displacement, although basically regulated by local clocking, may be modified in either direction according to the nature of signal received over path MO. The aperture defines (within the averaging signal detector) the permissible limits within which it is required that reception of each incoming FAS signal should occur; corrective action being taken in the appropriate sense or direction in the event of either of said limits being exceeded.

Figure 4:
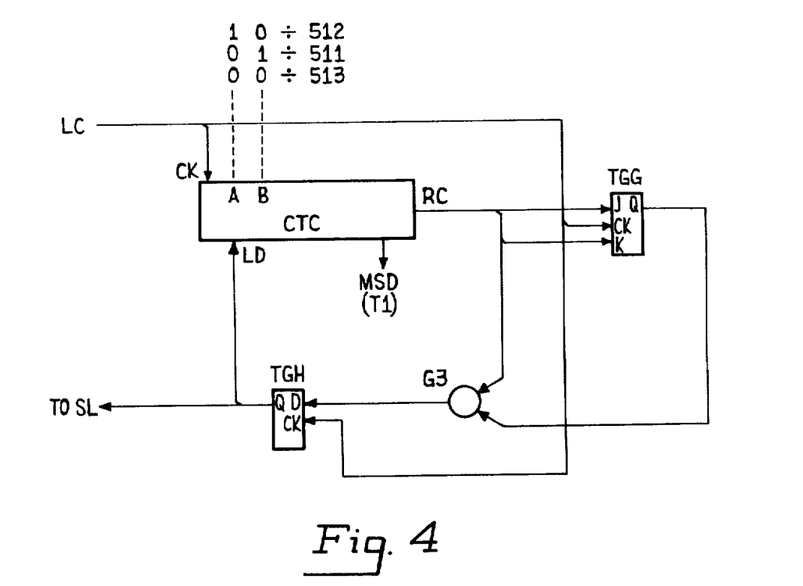
FIG. 4 shows a circuit diagram of an offset device OSD.

Referring to FIG. 2 and FIG. 4 device OSD comprises an 8 bit counter CTC which divides the local clock LC by 512 providing a timing interval of 125 μsec. The most significant digit of counter CTC is high for 62.5 μsec and low for another 62.5 μsec providing the waveform (T1) for device ASD.

Upon switch on or when line delay changes occur, modify control instructions MO are fed to inputs A, B of counter CTC to cause the counter length to be changed to either 511 or 513 until the error condition is removed.

The ripple carry RC output of counter CTC is presented to the J and K inputs of toggle TGG, the Q output of which is presented to NAND-gate G3 together with the RC output of counter CTC. The output of gate G3 is presented to the D-input of toggle TGH the output of which provides a load for counter CTC and device SL (FIG. 2).

Four devices of the link unit are directly concerned with the previously mentioned assessment of local and incoming "A", "R" or "Z" signals represented at the outputs of detectors ASD and DET respectively. These are:

(a) the oscillator control logic OL, (b) the signal generator SG controlled via device AL, (c) a logic circuit SL concerned with symmetrical line-delay changes, and (d) a logic circuit AL concerned with asymmetrical line-delay changes.

Each of these devices except for signal generator SG has input paths L and I the first of which is served by the averaging signal detector ASD as regards local "A", "R" and "Z" signals whereas, the second is served by detector DET as regards "A", "R" and "Z" signals derived from the incoming transmission.

Figure 5:
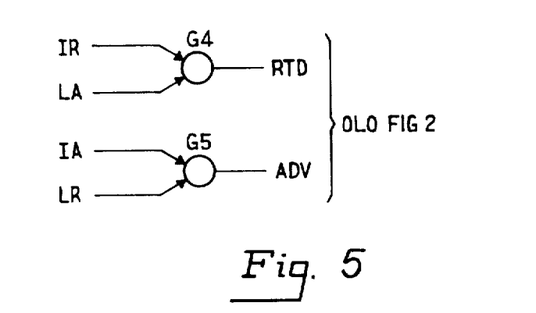
FIG. 5 shows a circuit diagram of oscillator control logic OL.

Referring to FIG. 2 and FIG. 5 the oscillator control logic OL is arranged to exercise, over output lead OLO, conditional control of the common oscillator OSC of switching centre B by way of the so-called voting circuit VC and the frequency controller OC. Circuit OL comprises two AND-gates G4 and G5. Gate G4 receives the incoming retard signal IR and local advance signal LA and the output RTD is used via device VC to retard the oscillator OSC (FIG. 2). Gate G5 receives the incoming advance signal IA and local retard signal IR and the output ADV is used via device VC to advance oscillator OSC (FIG. 2). Output signals RTD and ADV represent signal OLO (FIG. 2). Controller OC can advance or retard the oscillator or do nothing in respect of its frequency according to whether an "A" (advance), "R" (retard) or "Z" (do-nothing) instruction is received from the voting circuit. Circuit VC, besides being controlled by lead OLO from control logic OL of the particular link unit, is controlled over a corresponding lead from each of the other link units at the switching centre.

The operation of the typical oscillator control logic OL is summarized thus:

TABLE 1

| OSCILLATOR CONTROL LOGIC OL | | | |
|---|---|---|---|
| INPUT I (INCOMING) | INPUT L (LOCAL) | DISSENSION D FROM VC | ACTION |
| A (advance) | R (retard) | 0 | Advance local oscillator |
| R (retard) | A (advance) | 0 | Retard local oscillator |
| R (retard) | A (advance) | 1 | Retard local oscillator |
| A (advance) | R (retard) | 1 | Advance local oscillator |

However, the action specified is always conditional on the prevailing state of the voting circuit which only gives-out an advance instruction if it is receiving an advance signal from one or more link units of the switching centre to the exclusion of any retard signal. Similarly a retard instruction is only produced by circuit VC when it receives one or more retard signals without any advance signal.

It is to be noted that if a situation develops whereby the voting circuit receives an advance (or retard) signal from the typical link circuit when a signal of opposite significance is forthcoming from any other link unit or units, the circuit VC produces a "D" or dissension signal which is applied to the input path D of all the asymmetrical logic unit such as AL of the particular switching centre.

Figure 6:
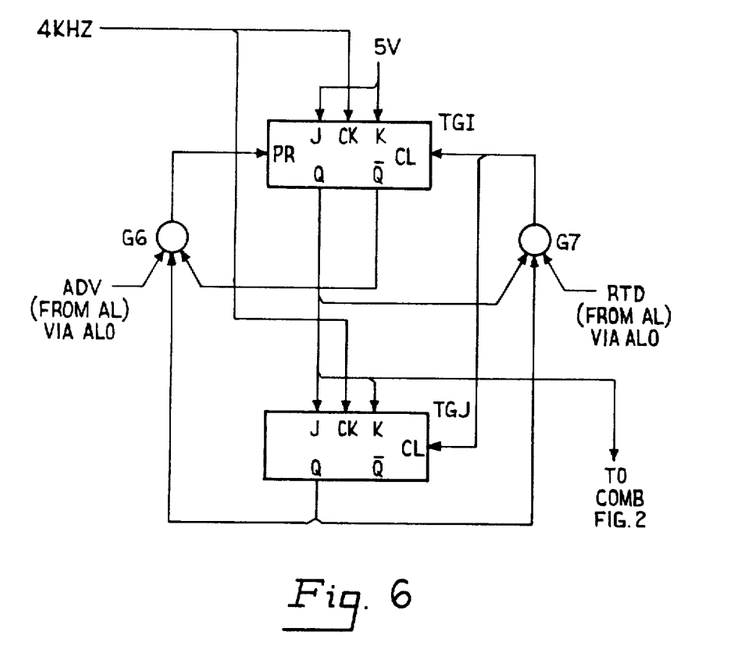
FIG. 6 shows a circuit diagram of a signal generator SG.

Referring to FIG. 2 and FIG. 6 the signal generator SG comprises two J.K. toggles TGI and TGJ connected as a divide by four counter driven by a 4 KHz clock pulse. Toggle TGI has its preset input connected to the output of NAND-gate G6 and its clear input connected to the output of NAND-gate G7. The clear inputs CL of toggles TGI and TGJ are connected to the output of gate G7. Gate G6 receives signals from the $\bar{Q}$ output of toggle TGI, the Q output of toggle TGJ and the advance signal ADV from circuit AL. Gate G7 receives signals from the Q output of toggle TGI and the Q output of toggle TGJ together with the retard signal RTD from circuit AL.

The signal generator is controlled over lead ALO from the asymmetric logic device AL. As a result of these controls, the signal generator SG has the facility for applying an "A", "R" or "Z" signal via circuit AL to the combiner COMB in a form suitable for insertion into the outgoing transmission. Typically these inserted signals, giving a degree of security, comprise the binary codes "110", "100" and "10" respectively, and the selected code is to be repeatedly transmitted until the originating error-situation has been rectified. The binary digits of the employed repetitive code-signal are individually inserted in the fifth bit location of slot O of odd line-frames. The operation of the signal generator is summarized thus:

TABLE 2

| | SIGNAL GENERATOR SG | | | |
|---|---|---|---|---|
| INPUT ALO | INPUT I (INCOMING) TO CIRCUIT AL | INPUT L (LOCAL) TO CIRCUIT AL | | ACTION |
| NO | A or R or Z | A | A | Apply an advance or retard signal to combiner COMB |
| NO | A or R or Z | R | R | |
| YES | A | Z | A | |
| YES | R | Z | R | |

It may be taken that Z signals are always being injected into the outgoing transmission, via the combiner COMB under control of the logic circuitry of signal generator SG, when A and R signals are not being transmitted. Accordingly with no input at ALO and a "Z" input at lead L (local), the combiner will be injecting "Z" into the transmission format.

The symmetrical-change logic circuit SL is operative in those instances when the propagation delay of the transmission lines L1 and L2 changes symmetrically, i.e. increases or decreases, substantially equally, for both transmission directions. This logic circuit is controlled from I (incoming A-R-Z) and L (local A-R-Z) inputs, and in turn exercises control of the off-set device OSD over path MO when both inputs are A or R persistently present its functions are summarized thus:

TABLE 3

| | LOGIC CIRCUIT SL | |
|---|---|---|
| INPUT I (INCOMING) | INPUT L (LOCAL) | ACTION (VIA OFF-SET DEVICE OSD) |
| A | A | Advance off-set position Divide by 513 |
| R | R | Retard off-set position Divide by 511 |

Advancing the off-set caters for increase in propagation time whereas retard the off-set caters for decrease in the time.

Figure 7:
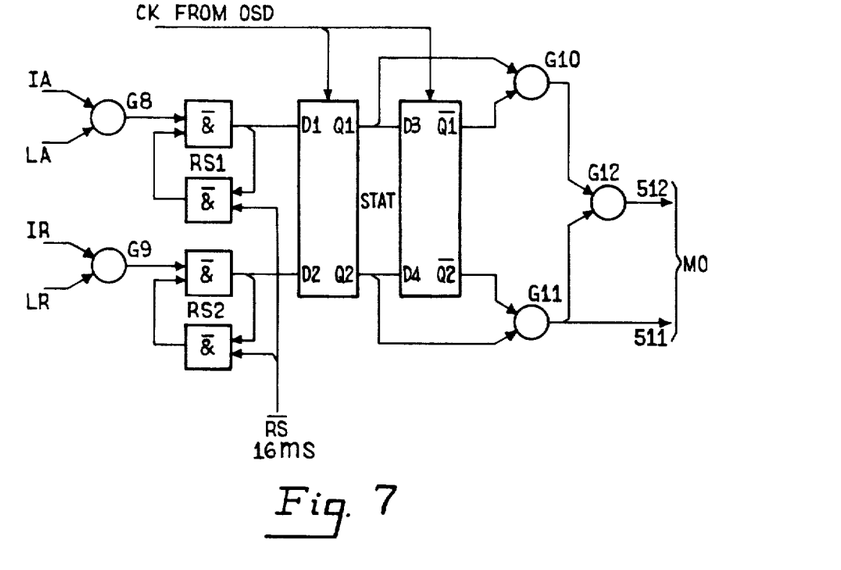
FIG. 7 shows a circuit diagram of a symmetrical-change logic device SL.

Referring to FIG. 2 and FIG. 7 circuit SL comprises two NAND-gates G8, G9. Gate G8 receives incoming and local advance signals IA and LA respectively and gate G9 receives incoming and local retard signals IR and LR respectively. The outputs of gates G8, G9 are fed to respective latches RS1 and RS2 which are reset by signal $\overline{RS}$ every 16 ms. Latches RS1 and RS2 are connected to statisiser STAT which is clocked by the signal received from device OSD. Statisiser outputs Q1, $\overline{Q1}$ are presented to AND-gate G10 and outputs Q2, $\overline{Q2}$ are presented to AND-gate G11. Gates G10, G11 outputs are presented to NOR-gate G12. The outputs of gates G11 and G12 represent signal MO and are presented to device OSD.

Figure 8:
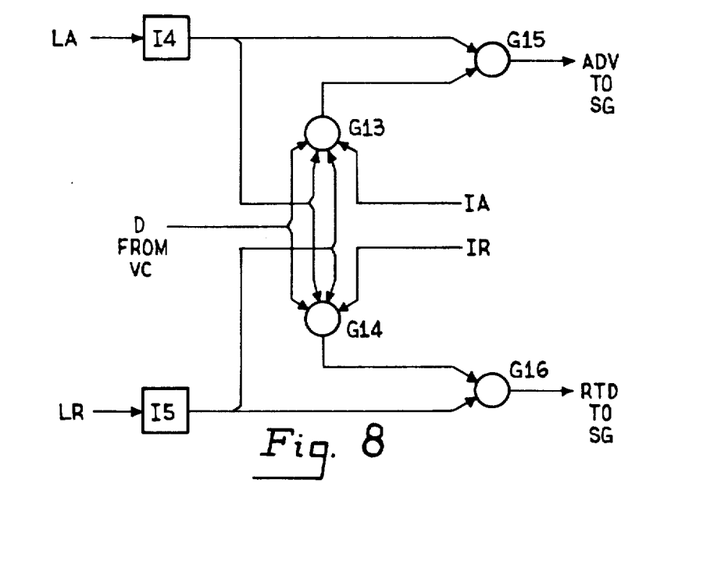
FIG. 8 shows a circuit diagram of an asymmetrical-change logic device AL.

Referring to FIG. 2 and FIG. 8 the asymmetrical change logic circuit AL comprises two inverters I4 and I5 respectively receiving local advance and retard signals LA and LR-NAND-gates G13, G14 receive the outputs of inverters I4 and I5 and incoming advance and retard signals IA and IR respectively. Gates G13 and G14 also receive the dissension signal D from device VC. The output of gate G13 is presented to NAND-gate G15 together with the output of inverter I4. The output of gate G15 represents an advance signal ADV to be presented to device SG. The output of gate G14 is presented to NAND-gate G16 together with the output of inverter I5. The output of gate G16 represents a retard signal RTD to be presented to device SG.

The asymmetrical-change logic circuit AL is operative in those instances where dissimilar persistent changes take place in the propagation delay of the two lines L1 and L2 of the exemplary link. It is controlled from a "dissension" input at lead D (and derived from the voting circuit VC) in addition to incoming and local A-R-Z inputs (I and L respectively). As indicated in TABLE 4, below, logic circuit AL produces a signal at least ALO under two specific circumstances (but not otherwise) to complete the control of the signal generator in accordance with the last two lines of TABLE 2 above:

TABLE 4

| | LOGIC CIRCUIT AL | | |
|---|---|---|---|
| INPUT D (DISSENSION) | INPUT I (INCOMING) | INPUT L (LOCAL) | ACTION |
| YES | A | Z | ALO signal to signal generator SG |
| YES | R | Z | |

At this juncture it can be understood that an "A", "R" or "Z" signal transmitted by switching centre B appears as a constituent of the incoming multiplex transmission, at termination TA of switching centre A; bit 5, slot O of odd frames being used as mentioned. Bearing in mind that the two centres are identically equipped, at centre A the incoming repetitive signal, "110", "100" or "10" is applied to detector DET which, over a small number of repetitions, responds appropriately to the relevant bits and so produces a signal of "A", "R" or "Z" significance at its output path OD. This signal, together with the prevailing one of the locally derived signals from the averaging signal detector ASD, generates particular control condition, as already tabulated.

The signal forthcoming from the oscillator control logic OL is extended to the oscillator control device OC (via the volting circuit) which, in the case of an advance ("A") or retard ("R") signal respectively, causes the oscillator to slightly increase or decrease its frequency. As a consequence of the frequency change, the local clock-rates are changed in the same direction. It is to be noted that in the absence of any dissension signal D from the voting circuit VC, the oscillator at each centre changes its frequency (with corresponding change of local clock rates) in accordance with the instruction signal received from the other centre; the direction of change being opposite in each case. The link unit of synchronising utility LU at both centres duly recognise that the remote oscillator has been corrected whereupon the averaging signal detector ASD of each centre separately removes the "A" or "R" signal from the transmission (opposite signal from each centre) to terminate the correcting activity of the oscillator control device OC at the other centre.

From the foregoing operational description it can be deduced that in the case frequency drift of the common oscillator of one switching centre relative to another, the resultant clock-error is recognised in each case at the partner switching-centre which thereupon transmits an advance or retard instruction, as appropriate, to the other centre. Said instruction is repetitive until said partner centre recognises, by re-assessment of the incoming transmission bit-rate that correction of either one or both oscillators has been accomplished so as to remove the relative error.

The link unit LU caters for the inhibition of the above-described process of mutual control, if a situation arises whereby both switching centres of a link recognise errors of the same polarity; causing so-called symmetrical signalling which comprise each switching-centre transmitting the same signal (A or R) to the other. The correction required in such a situation, namely adjustment of apertures or off-sets at both centres, is comparable to that which would be instituted by a symmetrical change of the transmission propagation-time of the particular two-way link. The logic circuit SL is provided to meet the symmetrical signalling situation. Its I and L input leads are served by the signalling detector DET and the averaging signal detector ASD respectively, and in the circumstances mentioned both receive identical inputs A or R. This, in accordance with TABLE 3, result in appropriate adjustment of the aperture off-set by device OSD by way of path MO after the signal has persisted for some period of time. In either event the logic circuit OL is not satisfied and this prevents change of frequency of the oscillator of the particular switching-centre. A similar procedure takes place at both ends of the link.

When the synchronising unit at one end only of a two-way link detects a bit-rate drift error, significant of change in propagation-time in only one of the two lines of the link, then neither the switching-centre receiving the "A" or "R" signal from its partner centre nor the centre (partner) receiving the "Z" signal will take action to adjust its common oscillator. This arises as follows assuming that the line L1 incoming to the centre B has been subjected to the change: In centre B, the output lead OA of detector ASD changes from the normal Z condition to A or R according to whether the propagation-time has increased or decreased respectively. With the signal of the incoming line-transmission format persisting to indicate Z (no -change) the corresponding Z signal remains at the output lead OD of detector DET. The conditions of leads OA (i.e. A) and OD (A or R) are jointly effective on signal generator SG in accordance with TABLE 2, to the exclusion of the logic devices OL, SL as can be deduced from TABLES 1, 3 and 4 respectively. Therefore generator SG is operative over the combiner COMB to replace the "Z" signal hitherto injected into the outgoing transmission to A or R respectively according to whether a decrease or increase of propagation-time of the incoming line exists and requires to be compensated for. With devices OL and SL in-operative no change is made to the local oscillator or the off-set device. The A or R signal of the transmission from centre B is duly detected at centre A, and the corresponding signal A or R is produced by detector DET thereat, but the output of the averaging signal detector ASD remains at Z because no change of bit-rate of the incoming transmission has occurred. Under these circumstances devices OL and SL remain disabled so that no change is applied to the local oscillator or the off-set device of centre A. Also in the absence of a dissension signal at lead D of the asymmetrical logic device AL, the latter produces no signal at lead ALO, so the signal generator continues to inject a Z signal into the transmission to centre B. In the foregoing circumstances, the instruction signal A or R incorporated in the transmission received by centre A is disabled and in particular, no change is made to the oscillator speed of that centre as was also the case at centre B.

However in a complex switching network, a situation may develop with respect to the two centres whereby the "A" (or "R") and "Z" signal interchange is evident whilst a condition of dissent is evident at the centre receiving the "A" or "R" signals. The dissent is demonstrated by a dissension signal "D" being presented over lead D to the logic circuit AL by the so-called voting circuit VC. This is made to produce a dissent signal only if it is receiving an "A" or "R" signal from output lead OLO of the oscillator control logic OL concurrently with a signal of the opposite significance from at least one other link unit LU of the switching-centre. The dissension is virtually indicating that the incoming request for oscillator frequency-change at the particular centre appears to be invalid.

In the circumstances just outlined it is assumed that the illustrated synchronising utility of switching-centre B (FIG. 2) is receiving "A" or "R" signals and is transmitting "Z" signals and moreover that the situation, as signified by said D lead dissent signal, exists at centre B. As may be deduced from TABLE 2 and TABLE 4, the logic circuit AL is uniquely responsive, after a suitable persistence period provided by an in-built delay, to the received "A" or "R", the locally generated "Z" signal and said dissent signal collectively. Thereupon it so conditions its output path ALO that signal generator SG is activated to insert in the outgoing transmission (instead of "Z") a signal corresponding with that ("A" or "R") included in the incoming transmission. Thus the incoming signal is effectively turned around and re-transmitted to centre A. The outcome of this is that the states of logic circuit OL, AL and SG of relevant link unit at switching-centre A remains unchanged by the identical "A" or "R" inputs applied to them. Therefore the frequency of the local oscillator at centre A remains unchanged and the A or R transmission to centre B persists. However the condition which is produced at lead MO of the logic circuit SL, due to said link input signals, is such as to cause device OSD to appropriately adjust the off-set to resolve the situation, at centre A, in the correct manner.

The use of a voting circuit at each switching centre of a complex multi-centre switching network, with said circuit arranged to control and be controlled by all the link units of the particular centre, enables a mean network frequency of high-stability to be attained and maintained in operational use. However it is not necessary for this situation to be totally determined on a democratic voting basis. For example in the case of an end switching-centre, i.e. a centre which is linked to but one other centre of the network, the end switching-centre may be rendered operative, in regard to control of its oscillator and clock frequencies, as the slave in a master/slave relationship with said other centre; the latter centre controlling the oscillator at the end switching-centre without reciprocal control from the last-mentioned centre. In such a situation the particular link unit LU at the master end of the link, although being permitted to receive a dissension signal from the voting circuit, is prevented from influencing the local oscillator and for this purpose for example the output lead OLO of the oscillator control logic of the particular link unit is disconnected.

The overall truth table relating to FIG. 2 is shown below:

TABLE 5

OVERALL TRUTH TABLE

| INCOMING SIGNALLING FROM REMOTE CENTRE | LOCAL SIGNALS FROM ASD | LOCAL OUTGOING SIGNALS TO REMOTE CENTRE | DISSENSION D FROM VC | OUTPUT TO VC | MODIFY (MO) TO OSD Divide By |
|---|---|---|---|---|---|
| Z | Z | Z | 0 | Z | 512 |
| A | Z | Z | 0 | Z | 512 |
| R | Z | Z | 0 | Z | 512 |
| Z | A | A | 0 | Z | 512 |
| A | A | A | 0 | Z | 513 |
| R | A | A | 0 | R | 512 |
| Z | R | R | O | Z | 512 |
| A | R | R | 0 | A | 512 |
| R | R | R | 0 | Z | 511 |
| Z | Z | Z | 1 | Z | 512 |
| A | Z | A | 1 | A | 512 |
| R | Z | R | 1 | R | 512 |
| Z | A | A | 1 | Z | 512 |
| A | A | A | 1 | Z | 513 |
| R | A | A | 1 | R | 512 |
| Z | R | R | 1 | Z | 512 |
| A | R | R | 1 | A | 512 |
| R | R | R | 1 | Z | 511 |

In a simple system, involving merely two switching-centres or nodes, either mutual control or unilateral control may be provided. In both instances the voting circuit is redundant to requirements. In the case of mutual control the oscillator over frequency at both centres is responsive, without the intervention of the voting circuit, to the output (lead OLO) of the oscillator control logic OL. On the other hand to cater for unilateral control, the arrangement at the slave switching-centre would be that the output of oscillator control logic OL is used as just-mentioned, but at the master switching-centre lead OLO remains un-connected.

What we claim is:

1. A communication network including a first centre and at least a second centre connected together by a two-directional link having a multi-channel t.d.m. transmission system using p.c.m. techniques for each direction of transmission, wherein each said centre includes a substantially-stable oscillator for the control of a local clock which controls the bit-rate of the outgoing transmission of the centre and other possible outgoing transmissions of the centre, and wherein each centre includes at least one link equipment responsive to the incoming transmission and operative to synchronise the outgoing transmission of the particular centre with the local clock, said at least one link equipment in each centre including:

(a) first detecting means for assessing the position bit-rate of the incoming transmission in relation to the acceptable threshold limits of a position datum, said bit-rate being set according to the frequency of the oscillator of the other centre and arranged to produce one of three output signals indicating that the position of the incoming transmission is, by comparison with said datum, lagging or leading within said limits or equal to said datum, (b) second detecting means responsive to one of three mutually-exclusive control signal patterns is included in said incoming transmission for producing an output signal appropriate to a request from said other centre for advancement or retardation or no-change of the frequency of the local oscillator, (c) means for injecting into the outgoing transmission, in dependence upon the output signals from said first and second detecting means, one of three control-signal patterns, including an advancement signal, a retardation signal and a no-change signal signifying requests for advancement, retardation and no-change, respectively, of the frequency of the oscillator at the other centre, and (d) first logic means controllable by said first and second detecting means for producing a first signal to increase the local oscillator frequency as a result of the first detecting means signifying that the incoming transmission is leading said datum and said second detecting means requesting advancement, or for producing a second signal to decrease the oscillator frequency as a result of said first detecting means signifying that the incoming transmission is lagging said datum and said second detecting means is requesting retardation.

2. A communication network as claimed in claim 1, wherein the signal produced by said first logic means is connected to an input lead of a voting circuit serving the local oscillator and having an input lead for each link equipment provided at the centre; said voting circuit being actuated to disable said first signal for increase or said second signal for decrease of the oscillator frequency as appropriate but only if a signal of opposite significance is also received from any other said link equipment.

3. A communication network including a first centre and at least a second centre connected together by a two-directional link having a multi-channel t.d.m. transmission system using p.c.m. techniques for each direction of transmission, wherein each said centre includes a substantially-stable oscillator for the control of a local clock which controls the bit-rate of the outgoing transmission of the centre and other possible outgoing transmissions of the centre, and wherein each centre includes at least one link equipment responsive to the incoming transmission and operative to synchronise the outgoing transmission of the particular centre with the local clock, said at least one link equipment in each centre including:

(a) first detecting means for assessing the position of the incoming transmission at a predetermined bit-rate in relation to acceptable threshold limits of a position datum, said bit-rate being set according to the frequency of the oscillator of the other centre and arranged to produce one of three output signals indicating that the position of the incoming transmission is, by comparison with said datum, lagging or leading within said limits or equal to said datum, (b) second detecting means responsive to one of three mutually-exclusive control signal patterns included in said incoming transmission for producing an output signal appropriate to a request from said other centre for advancement or retardation or no-change of the frequency of the local oscillator, (c) means for injecting into the outgoing transmission, in dependence upon the output signals from said first and second detecting means, one of three control-signal patterns, including an advancement signal, a retardation signal and a no-change signal signifying requests for advancement, retardation and no-change, respectively, of the frequency of the oscillator at the other centre and (d) first logic means controllable by said first and second detecting means for producing a first signal to increase the local oscillator frequency as a result of the first detecting means signifying that the incoming transmission is leading said datum and said second detecting means requesting advancement, or for producing a second signal to decrease the oscillator frequency as a result of said first detecting means signifying that the incoming transmission is lagging said datum and said second detecting means is requesting retardation;

wherein the signal produced by said first logic means is connected to an input lead of a voting circuit serving the local oscillator and having an input lead for each link equipment provided at the centre; said voting circuit being actuated to disable said first signal for increase or said second signal for decrease of the oscillator frequency as appropriate but only if a signal of opposite significance is also received from any other said link equipment;

wherein said means for injecting said one of three control-signal patterns into the outgoing transmission of the link comprises a signal combiner for deriving the appropriate signal-pattern data from a signal generator controllable by the outputs of said first and second detecting means via delay means for introducing delay, and which, in the absence of any modifying control signal from the input lead of the signal generator, causes the no-change signal injected into the outgoing transmission to be replaced by an advancement or retardation signal if the output of the first detecting means signifies that the incoming transmission is lagging or leading, respectively, regardless of the state of the second detecting means.

4. A communication network as claimed in claim 3, wherein the link equipment incorporates a second logic means which is controllable by the output of the first and second detecting means and from an output lead of said voting circuit, which output lead has a dissent signal connected to it when the voting circuit is receiving input signals of opposite significance, whereas said signal generator is also controlled over its input lead by the output of said second logic means; the second logic means in conjunction with the signal generator being operative, in the presence of said dissent signal and an advancement or retardation signal in the incoming transmission whilst the output of said first detecting means is signifying that the incoming transmission position lies evidently within said limits, for injecting a signal identical with that of the incoming transmission into the outgoing transmission.

5. A communication network as claimed in claim 4, wherein the link equipment also includes an off-set device for supplying said threshold limits and set to provide an off-set for said threshold limits to compensate for the propagation delay of the incoming transmission medium, and said first detecting means is controlled jointly from a first condition derived from a frame alignment signal derived from the incoming transmission and a second condition derived from said off-set device.

6. A communication network as claimed in claim 5, comprising third logic means included in the link equipment and controllable by the outputs of said first and second detecting means for effecting adjustment of the setting of both threshold limits of said off-set device in the event of each direction of transmission being subjected to a change in propogation time of the same sense.

* * * * *